No. 117. REISSUED JUNE 13, 1848.

S. F. B. MORSE.

ELECTROMAGNETIC TELEGRAPH.

4 SHEETS—SHEET 1.

The System of Signs.

Example 1st — 1st For Numerals.

Example 2d — For Compound Numerals.

Showing the numerals combined together.

Example 3d — 2d For Letters

The System of Type.

Example 4th — 1st For Numerals.

Example 5th — 2d For Letters

Example 6th — Type for Circular Portrule.

No. 117. REISSUED JUNE 13, 1848.
S. F. B. MORSE.
ELECTROMAGNETIC TELEGRAPH.
4 SHEETS—SHEET 2.
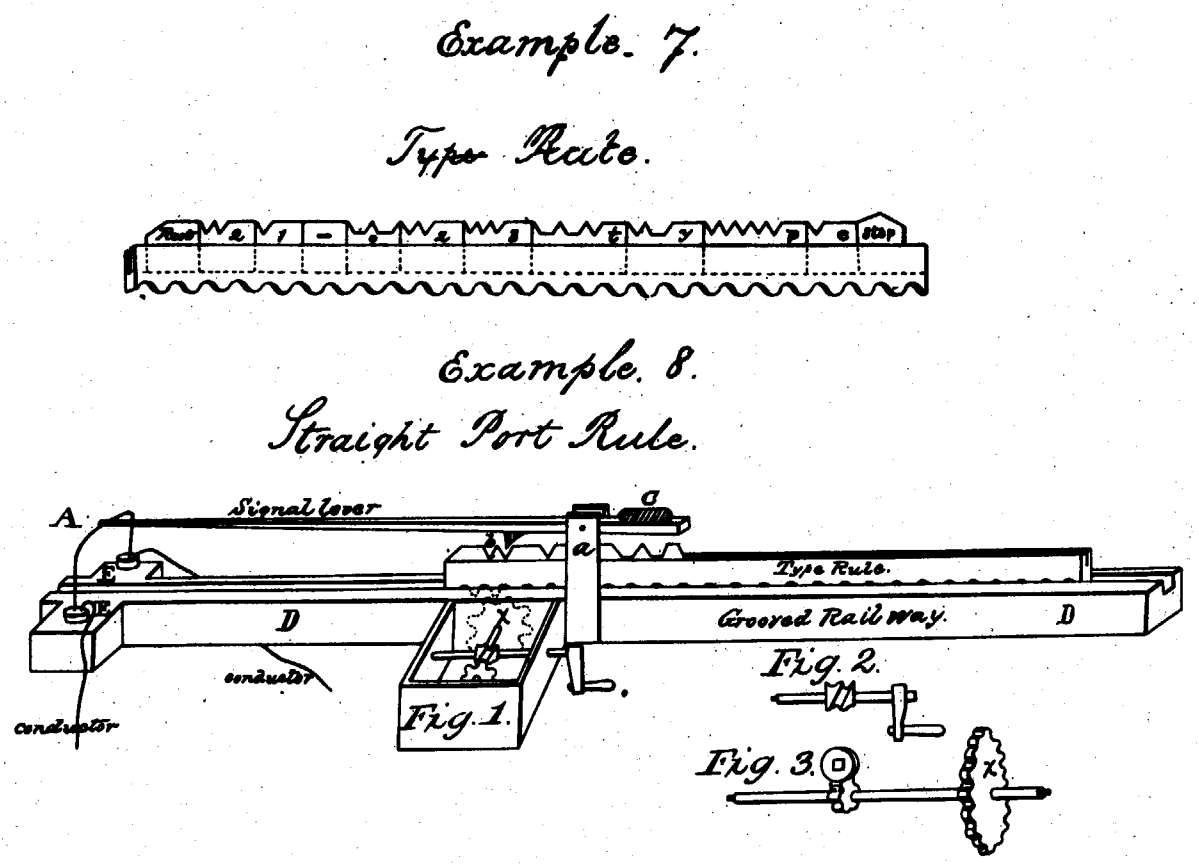

No. 117. REISSUED JUNE 13, 1848.

S. F. B. MORSE.

ELECTROMAGNETIC TELEGRAPH.

4 SHEETS—SHEET 3.

Example 10

Register

No. 117. REISSUED JUNE 13, 1848.

S. F. B. MORSE.

ELECTROMAGNETIC TELEGRAPH.

4 SHEETS—SHEET 4.

Example, 11.

UNITED STATES PATENT OFFICE.

S. F. B. MORSE, OF POUGHKEEPSIE, NEW YORK.

IMPROVEMENT IN ELECTRO-MAGNETIC TELEGRAPHS.

Specification forming part of Letters Patent No. 1,647, dated June 20, 1840; Reissue No. 79, dated January 15, 1846; Reissue No. 117, dated June 13, 1848.

*To all whom it may concern:*

Be it known that I, SAMUEL F. B. MORSE, now of Poughkeepsie, in the county of Duchess, in the State of New York, have invented a new and useful apparatus for and a system of transmitting intelligence between distant points by means of electro-magnetism, which puts in motion machinery for producing sounds or signs, and recording said signs upon paper or other suitable material, which invention I denominate the "American Electro-Magnetic Telegraph;" and I do hereby declare that the following is a full, clear, and exact description of the principle or character thereof, which distinguishes it from all other telegraphs previously known, and of the manner of making and constructing said apparatus and applying said system, reference being had to the accompanying drawings, making part of this specification, in which—

Figure 1:
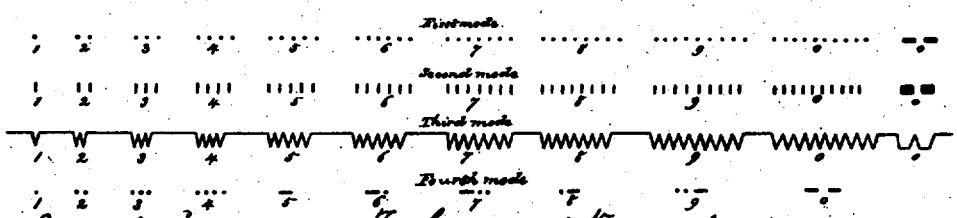
Figure 1:
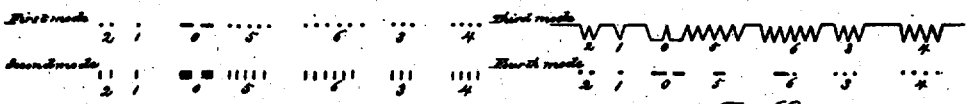
Figure 1:
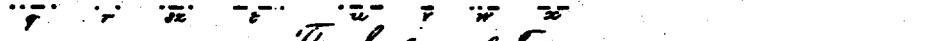
Figure 2:
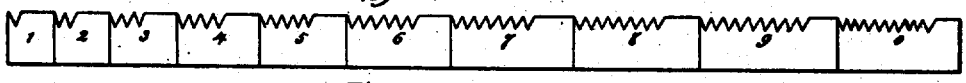
Figure 1:
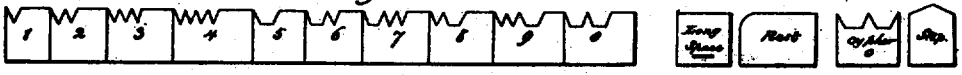
Figure 1:
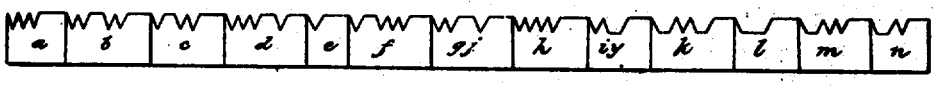
Figure 1:
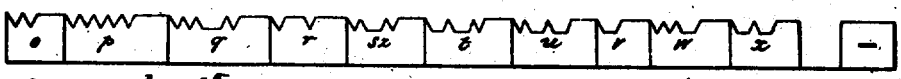
Figure 2:
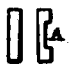
Figure 2:
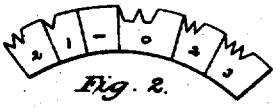
Figure 3:
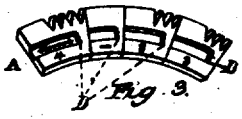
Figure 1:
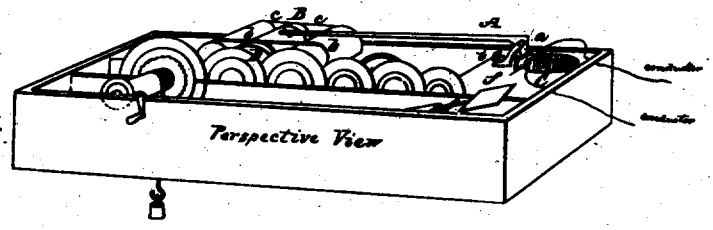
Figure 2:
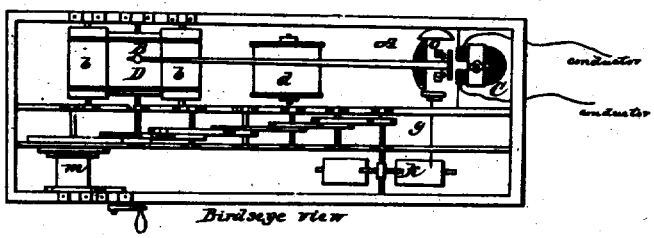
Figure 3:
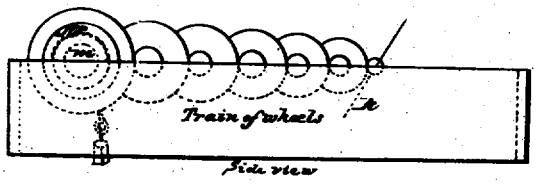
Figure 4:
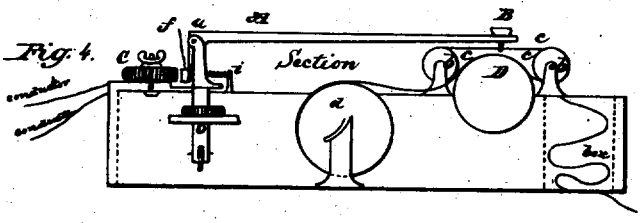
Figure 5:
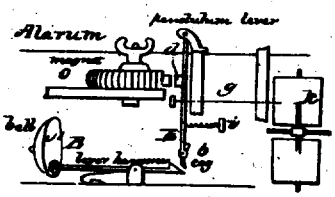
Figure 1:
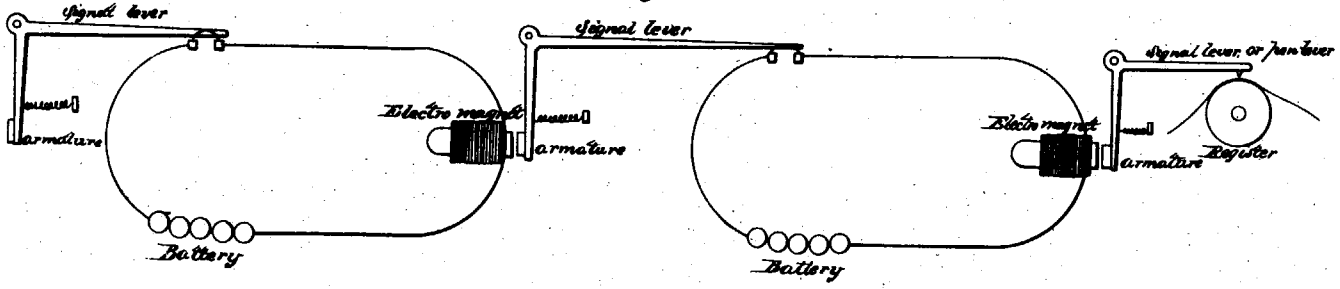
Figure 2:
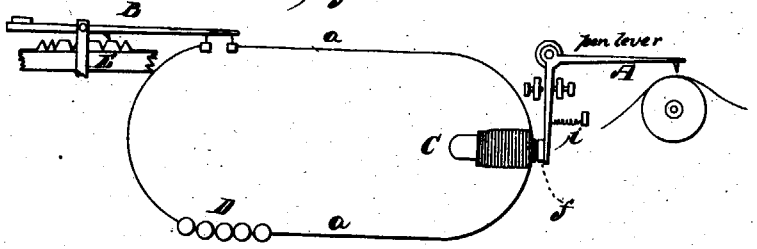

Examples 1, 2, and 3 show my system of signs, consisting of a combination of dots and spaces, and of dots, spaces, and horizontal lines, intended to represent—example 1, signs for numerals; example 2, signs for compound numerals; example 3, signs for letters; all which signs may also represent words or sentences. Examples 4, 5, and 6 are specimens of the form of type used for regulating the imprinting of the signs. Example 7 is the type rule; example 8, apparatus for connecting and breaking the electrical or galvanic circuit. Example 10, Figure 1 is a perspective view of the registering apparatus; Fig. 2, a top plan; Fig. 3, a side elevation of the train of wheels moving the paper and regulating its motion; Fig. 4, a sectional elevation of the registering-lever and parts appended thereto; Fig. 5, alarm apparatus. Example 11 is a diagram showing the relative positions of the different parts of an approved form of apparatus, including a combination of circuits.

Prior to my first application for a patent it had been essayed to use the currents of electricity or galvanism for telegraphic purposes, either by decomposition or the action or exercise of the deflective force of a current upon a magnetized bar or needle, which decomposition or deflection required to be noted by occular inspection at the instant the sign was made.

By my invention the intelligence can be transmitted and imprinted on paper or other suitable substance without requiring the aid of any person at the station to which the communication is transmitted, so as to be read at any time thereafter. My apparatus for this purpose consists of two principal parts or combinations.

The first part consists of a galvanic battery or any known generator of galvanism or electricity, a galvanic or electric circuit composed of any known conductors of electricity, a port-rule and signal-lever or other contrivance for closing and breaking the circuit, all in combination with an electro-magnet or device by which the motive power of the electric or galvanic current, which I call "electro-magnetism," may be developed and applied to give motion to other machinery for the purpose of marking or imprinting intelligible characters, signs, or letters at any distances. The conductors may be suspended in the air upon posts or otherwise, or buried in the ground, being always well insulated at the posts or in the ground. This combination is illustrated in the annexed drawings in example 11, Fig. 2, where D indicates the battery; *a a*, the circuit; E, the port-rule; B, the signal-lever, and C the electro-magnet.

The new parts and the operation of this portion of my apparatus I thus further describe viz:

At any convenient point in the circuit (generally near the generator) a break is made in the conductor, and the two ends thereof are immersed in mercury-cups, as shown in the drawings at E E, Fig. 1, example 8. To connect the circuit I employ an inverted U-formed piece of metal or other proper connector, A, suspended over the mercury-cups E E on the end of a horizontal lever, denominated in said drawing the "signal-lever," whose fulcrum is at *a*, so that when the connector A is dipped into the cups the circuit is completed. Between the fulcrum and connector A there is affixed to the under side of the lever, and projecting downward, a triangular tooth, *b*, which bears on the upper surface of the types about to be described, and is raised or lowered by them.

The lever may be counterbalanced by a weight or its equivalent, as at C, to make it move easily.

The types are composed of flat straight strips of metal, as shown in examples 4 and 5 of the drawings hereunto annexed, having their upper edges indented to suit the character to be represented, and which will be hereinafter more fully set forth in the description of the operation of the machine. The indentations are made of sufficient depth to allow the connector A to be plunged into the mercury, cups, and the highest surface raises it from them.

It is obvious that the forms of the upper surface of the types may be reversed and the cog *b* placed on the other side of the fulcrum, and the same effect would be produced.

The types are set up and confined in a rule to form any required sentences in one long line. This rule, demominated in the drawings, example 8, a "type-rule," has on its under side a rack that gears into a pinion, *x*, on a shaft under the grooved railways D, of common construction, on which said rule slides, and is directed under the cog *b* on the lever. The types are advanced at a regular speed by the application of any convenient power to the pinion *x*, and bring the notches or raised and depressed parts successively under the cog *b*.

The mercury-cups may be dispensed with, and any other convenient metallic contact be made to accomplish the same end, and the closing and breaking of the circuit may be effected by applying the hand or any other machinery to the signal-lever, or by any other mode adapted to the same end. The closing of the circuit by the depression of the signal-lever causes the electric current to run upon the circuit *a a*, example 11, Fig. 2, and through the helices of the electro-magnet C, which is thus charged with power to move any machinery which may be connected with it in a proper manner.

The second part of my invention consists of a register for recording the characters, signs, or letters transmitted from any distance, and is composed of the following parts in combination, viz:

A bent lever, A, as shown most distinctly in example 10 Fig. 4. To one arm of this lever there is attached one or more pencils, fountain-pens, or other suitable marking-instruments, B, directly under which is placed a suitable cylinder, D, over which the paper passes on which the markings for signs are made. This cylinder turns on its axis, and is connected by a train of wheels and pinions, with a barrel, *m*, Fig. 3, example 10, of common construction, which is driven by a weight and cord wound thereon, and also with a fly, K, of same figure, which regulates its motion. To the other arm of the lever (which is also an armature) is affixed a spiral spring, *i*, as seen in example 10, Figs. 1 and 4.

Near the cylinder D a reel or spool, *d*, is placed, on which a strip of paper or other markable material is wound, the end of which is carried over the cylinder D, and is confined thereon by means of two tapes and endless bands or their equivalents, one at each edge, which pass around two pulleys, *b b*, one on each side of cylinder D. This is clearly represented in Figs. 2 and 4, example 10. The clock-work is kept at rest by a detent [illegible] contact with the fly-wheel *k* in Fig. 3, and [illegible] nected with the lever, as shown in Fig. 5.

To the register may be attached an alarm-bell, as shown in example 10, Fig. 5, the machinery for striking which may be variously modified, and therefore need not be described.

The register or second part of my invention is operated upon by the first part in the following manner, viz: The short end of the pen-lever in the second part, as seen in example 10, Fig. 4, is an armature, *f*, which is brought in proximity to the electro-magnet C in the circuit *a a*, as shown in example 11, Fig. 2, and in example 10, Fig. 4. The electro-magnet C, being charged by closing the circuit, attracts the armature, bringing it nearly in contact, thus imparting a movement to the lever A. By this movement of the lever the detent, Fig. 5, example 10, is removed from the fly-wheel, and the clock-work begins to move, carrying the paper over the cylinder D, and at the same time the fountain-pen, pencil, or other marking-instrument is by the action of the lever set in motion. The circuit being broken, the lever is brought back to its position by the spiral spring *i*, and by the closing and breaking of the circuit more or less rapidly dots and spaces and marks of any required length are made upon the paper, and in any required combinations.

My system of characters consists of dots, spaces, and lines variously combined to form letters and other characters, a specimen of which is represented in examples 1, 2, and 3.

To make a dot, a notch or indentation is required in the types, into which the cog or tooth on the signal-lever will fall and instantly rise from as the types move onward; and when a line is to be formed on the paper at the register as a sign the notch in the type is extended, so that the lever will remain down for a space of time sufficient to make the line required.

The alarm-bell (shown at A, example 10, Fig. 5) may be struck by means of a hammer actuated by a supplementary electro-magnet placed in the same circuit as that first named.

Any convenient number of registers and registering-stations may be connected with the same circuit, all constructed and operating as above described.

To extend more effectually the communication by my apparatus, I adopt the following arrangement, whereby I can use any number of additional batteries or generators of electricity, and by which I can connect progressively any number of consecutive circuits, viz: I place at any point in the first circuit an electro-magnet, and opposite its poles I place an armature on a lever like that described for registering; but instead of using the said lever to mark with, I use it to close and break is used to close and break the first circuit. The second circuit has an independent battery, and may be used to work a register or other apparatus for registering, or to close and break a third circuit, or both, and thus by a combination of circuits the requisite power can be obtained at any distances *ad infinitum*. This combination is shown in example 11, Fig. 1.

It will be observed that my vocabulary system of signs or secret writing by cipher can be conveniently used in communicating by this telegraph, and any mode of closing and breaking a circuit may be adopted, the object being to do so at proper intervals.

Having thus fully described my invention, I wish it to be understood that I do not claim the use of the galvanic current or currents of electricity for the purpose of telegraphic communications generally; but

What I specially claim as my invention and improvement is—

1. Making use of the motive power of magnetism when developed by the action of such current or currents, substantially as set forth in the foregoing description of the first principal part of my invention, as means of operating or giving motion to machinery which may be used to imprint signals upon paper or other suitable material, or to produce sounds in any desired manner for the purpose of telegraphic communication at any distances. (The only ways in which the galvanic current had been proposed to be used prior to my invention and improvement were by bubbles resulting from decomposition and the action or exercise of electrical power upon a magnetized bar or needle and the bubbles, and the deflections of the needles thus produced were the subjects of inspection, and had no power, or were not applied to record the communication. I therefore characterize my invention as the first recording or printing telegraph by means of electro-magnetism. There are various known modes of producing motions by electro-magnetism; but none of these had been applied prior to my invention and improvement to actuate or give motion to printing or recording machinery, which is the chief point of my invention and improvement.)

2. The employment of the machinery called the "register" or "recording-instrument," composed of the train of clock-wheels, cylinders, and other apparatus, or their equivalents, for moving the material upon which the characters are to be imprinted, and for imprinting said characters, substantially as set forth in the foregoing description of the second principal part of my invention.

3. The combination of the machinery herein described, consisting of the generator of electricity, the circuit of conductors, the contrivance for closing and breaking the circuit, the electro-magnet, the pen or contrivance for marking, and the machinery for sustaining and moving the paper, all together constituting one apparatus or telegraphic machine, which I denominate the "American Electro-Magnetic telegraph."

4. The combination of two or more galvanic or electric circuits with independent batteries, substantially by the means herein described, for the purpose of obviating the diminished force of electro-magnetism in long circuits, and enabling me to command sufficient power to put in motion registering or recording machinery at any distances.

5. The system of signs consisting of dots and spaces, and of dots, spaces, and horizontal lines, for numerals, letters, words, or sentences, substantially as herein set forth and illustrated, for telegraphic purposes.

6. The system of signs consisting of dots and spaces, and of dots, spaces, and horizontal lines, substantially as herein set forth and illustrated, in combination with machinery for recording them, as signals for telegraphic purposes.

7. The types or their equivalent and the type-rule and port-rule, in combination with the signal lever or its equivalent, as herein described, for the purpose of closing and breaking the circuit of galvanic or electric conductors.

8. I do not propose to limit myself to the specific machinery or parts of machinery described in the foregoing specification and claims, the essence of my invention being the use of the motive power of the electric or galvanic current, which I call "electro-magnetism," however developed, for marking or printing intelligible characters, signs, or letters at any distances, being a new application of that power of which I claim to be the first inventor or discoverer.

SAM. F. B. MORSE.

In presence of—
GEO. WOOD,
J. READ BAILEY.